(12) United States Patent
Strott et al.

(10) Patent No.: US 9,915,577 B2
(45) Date of Patent: Mar. 13, 2018

(54) CASE ISOLATED OIL FILLED MEMS PRESSURE SENSOR

(71) Applicant: Sensata Technologies, Inc., Attleboro, MA (US)

(72) Inventors: Douglas B. Strott, Andover, MA (US); Russell P. Brodeur, Franklin, MA (US); Keith R. Washburn, Natick, MA (US)

(73) Assignee: Sensata Technologies, Inc., Attleboro, MA (US)

( * ) Notice: Subject to any disclaimer, the term of this patent is extended or adjusted under 35 U.S.C. 154(b) by 176 days.

(21) Appl. No.: 14/557,841

(22) Filed: Dec. 2, 2014

(65) Prior Publication Data

US 2016/0153858 A1    Jun. 2, 2016

(51) Int. Cl.
*G01L 9/00* (2006.01)
*G01L 19/06* (2006.01)
*G01L 19/00* (2006.01)
*G01L 19/04* (2006.01)
*G01L 19/14* (2006.01)

(52) U.S. Cl.
CPC .......... *G01L 9/0042* (2013.01); *G01L 9/0055* (2013.01); *G01L 19/0069* (2013.01); *G01L 19/04* (2013.01); *G01L 19/069* (2013.01); *G01L 19/142* (2013.01)

(58) Field of Classification Search
CPC ... G01L 9/0042; G01L 9/0044; G01L 9/0047; G01L 9/0048; G01L 9/005; G01L 9/0055; G01L 2009/0066; G01L 2009/0067; G01L 2009/0069; G01L 19/04; G01L 19/069
See application file for complete search history.

(56) References Cited

U.S. PATENT DOCUMENTS

| | | | | |
|---|---|---|---|---|
| 4,452,069 | A | * | 6/1984 | Hattori .............. G01L 19/0038 73/35.12 |
| 5,625,151 | A | | 4/1997 | Yamaguchi |
| 7,021,147 | B1 | * | 4/2006 | Subramanian ...... G01L 19/0645 73/708 |
| 2002/0029639 | A1 | | 3/2002 | Wagner et al. |
| 2004/0020300 | A1 | | 2/2004 | Boehler et al. |
| 2006/0075821 | A1 | * | 4/2006 | Otsuka ............... G01L 19/0084 73/715 |
| 2007/0148788 | A1 | | 6/2007 | Hsieh et al. |

(Continued)

FOREIGN PATENT DOCUMENTS

| | | |
|---|---|---|
| CN | 103454032 A | 12/2013 |
| DE | 102004048367 A1 | 4/2006 |

(Continued)

OTHER PUBLICATIONS

Extended European Search Report for EP15195593.7, "Case Isolated Oil Filled Mems Pressure Sensor", dated Apr. 21, 2016.

*Primary Examiner* — Paul West
(74) *Attorney, Agent, or Firm* — Burns & Levinson LLP; Joseph M. Maraia; George N. Chaclas

(57) ABSTRACT

An oil filled pressure sensor is provided. The sensor includes a drift-stabilized pressure sensing element mounted to and electrically isolated from a header body, the pressure sensing element immersed in an oil filled cavity and temperature stabilized for sensing pressure in the cavity without substantial signal drift. A method of fabrication is provided.

6 Claims, 13 Drawing Sheets

(56) References Cited

U.S. PATENT DOCUMENTS

2014/0033824 A1* 2/2014 Habibi .................. G01L 9/0073
                                                                                                        73/724
2014/0260648 A1    9/2014 Aoyama et al.

FOREIGN PATENT DOCUMENTS

| EP | 1074827 A2 | 2/2001 |
|---|---|---|
| JP | 2010256187 A | 11/2010 |
| WO | 2006102460 A1 | 9/2006 |

\* cited by examiner

CASE ISOLATED OIL FILLED MEMS PRESSURE SENSOR

BACKGROUND OF THE INVENTION

1. Field of the Invention

The invention disclosed herein relates to pressure sensors, and in particular to low cost packaging of a pressure sensor with limited influence of surface charge accumulation in oil filled packages.

2. Description of the Related Art

Offset drift due to surface charge accumulation is a well-known phenomenon and common failure mode occurring in a wide variety of semiconductor devices. The failure mechanism involves device surface charge accumulation which drives formation of charge inversion layers. The inversion layers compromise otherwise electrically isolating junction states. Growth of the charge inversion layer permits parasitic current leakage through the epi-layer, resulting in sensing element offset drift. As with many other types of devices, pressure sensing elements are influenced by this phenomenon.

Present day designs for pressure sensing elements that include a field shield are susceptible to surface charge accumulation and exhibit severe offset drift due to sense element charging. This is especially the case when deployed in oil encapsulated package assemblies and applications.

In many package configurations, the pressure sensing element is encapsulated by a dielectric oil. The oil provides for coupling of external absolute or differential pressure inputs with the sense element. Unfortunately, this also serves to couple external, electrostatic charge residing on the package, or elsewhere, to the sensing surface of the pressure sensing element. Typically, charge coupling occurs through polar alignment of molecules in the oil in response to an external field, and associated space charge accumulation at an interface of the sense element and the oil. Consequently, comparatively large external static charge may be coupled to the sensing element via the molecular polarizability of the oil. Such charge may be residing on, for example, plastic housing assemblies used to package the sensing element or introduced to the housing by electrostatic discharge (ESD) to the plastic package. This high static charge is more than sufficient to cause severe output shift.

Further complicating performance is the volumetric expansion and contraction of the oil as temperature is increased or decreased. The oil expansion exerts pressure against the isolation diaphragm and causes the sensor output to vary.

Further complicating performance is leakage of oil. Generally, poor sealing of such oil filled packages has also led to degraded performance, and ultimately the demise of a pressure sensor.

Thus, what are needed are methods and apparatus to improve the performance of pressure sensors encapsulated in an oil containing package.

SUMMARY OF THE INVENTION

In one embodiment, an oil filled pressure sensor is disclosed. The oil filled pressure sensor includes a drift-stabilized pressure sensing element mounted to and electrically isolated from a header body, the pressure sensing element immersed in an oil filled cavity and temperature stabilized for sensing pressure in the cavity without substantial signal drift.

The drift-stabilized pressure sensing element may include a pressure sensing unit with a field shield. The drift-stabilized pressure sensing element may be electrically isolated from the header body by at least one glass-to-metal seal. The drift-stabilized pressure sensing element may further include a diaphragm configured for reducing a volume of oil in the oil filled cavity, and the diaphragm may be at least one of corrugated and flat. A baseplate that may support the pressure sensing element may be included. The oil filled cavity may be generally defined by an assembly that includes the sensing element (MEMS assembly), a baseplate, and a diaphragm. The oil filled cavity may be hermetically sealed.

In another embodiment, a method for fabricating an oil filled pressure sensor is provided. The method includes selecting a drift-stabilized pressure sensing element mounted to and electrically isolated from a header body, the pressure sensing element configured to be immersed in an oil filled cavity and temperature stabilized for sensing pressure in the cavity without substantial signal drift; designing at least one of a sensor diaphragm and the oil filled cavity to limit the influence of temperature on output of the drift-stabilized pressure sensing element; and, incorporating the drift-stabilized pressure sensing element and the sensor diaphragm into the oil filled pressure sensor.

Designing the sensor diaphragm may include evaluating at least one of volume of the oil filled cavity and thermal coefficients of expansion (TCE) of the oil for the oil filled cavity. Designing the sensor diaphragm may include evaluating at least one of include thermal coefficients of expansion (TCE) of material used to construct the diaphragm, thickness of the material, width, diameter, geometry and flexibility of the diaphragm. Incorporating comprises connecting the drift-stabilized pressure sensing element to at least one glass-to-metal seal.

In another embodiment, an oil filled pressure sensor is provided. The oil filled pressure sensor includes a drift-stabilized pressure sensing element that includes sub-elements protected with a field shield, the drift-stabilized pressure sensing element mounted to and electrically isolated from a header body with at least one glass-to-metal seal, the pressure sensing element immersed in an oil filled cavity and temperature stabilized for sensing pressure in the cavity without substantial signal drift.

BRIEF DESCRIPTION OF THE DRAWINGS

The features and advantages of the invention are apparent from the following description taken in conjunction with the accompanying drawings in which.

DETAILED DESCRIPTION OF THE INVENTION

Disclosed herein are embodiments of oil-filled pressure sensors. Advantageously, the pressure sensors make use of low cost components and design to achieve high performance at a low cost. Specifically, the design permits the use of low cost metal stampings to form key structural components, as well as use of low cost high volume manufacturing methods such as laser welding. The design minimizes the volume of fill oil and uses a relatively large area flexible diaphragm to minimize the thermal errors associated with thermal expansion of the oil.

The use of a field shielded sensing element (referred to herein as a "pressure sensing unit"), also contributes to the low cost by reducing design complexity needed to overcome the influence of electric charges in the oil on data signals.

Further, the design is adapted to provide a high dielectric isolation from the metal housing parts as is required by some industrial applications. The adaptation uses a low cost easy to manufacture ultraviolet (UV) cured adhesive to prevent surface arc tracking across the glass to metal sealed transistor outline (TO) header pins. The dielectric isolation provides benefits of negligible coupling of electrical noise on the housing into the output signal and prevents high voltages from passing through the sensor to readout electronics. In conjunction with a properly designed electronic circuit board and signal conditioning electronics, the design achieves high performance electromagnetic compatibility for radiated susceptibility and conducted susceptibility. Additionally, the simple and low cost design provides for outstanding mechanical reliability under burst pressure and long term pressure cycling life.

Generally, the pressure sensors include pressure sensing unit that is configured for limiting the influence of surface charge or large static charge accumulation that may cause signal offset. In some embodiments, this is provided through use of an integrated field shield. Embodiments of the pressure sensor may also make use of a sensing assembly that is configured with electrical feed-through pins that include respective glass-to-metal seals. Advantageously, this combination substantially results in immunity against drift in output data from the sensor.

For example, by making use of these features, in one embodiment, a small size glass sealed header assembly is welded to a larger area stamped baseplate. The pressure sensing unit is attached to the header and a flexible diaphragm is welded to the stamped baseplate. This results in relatively low oil volume and a relatively large diaphragm area, both of which reduce the effect of thermal expansion of the fill oil.

Figure 1:
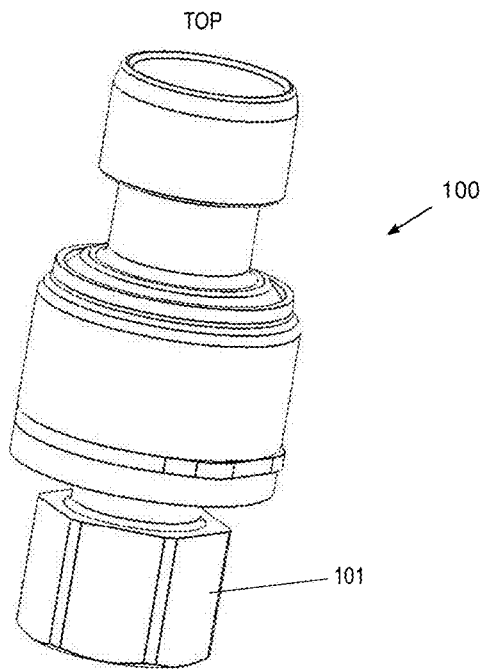
FIG. 1 is an isometric diagram depicting aspects of an exemplary pressure sensor according to the teachings herein.
Figure 2:
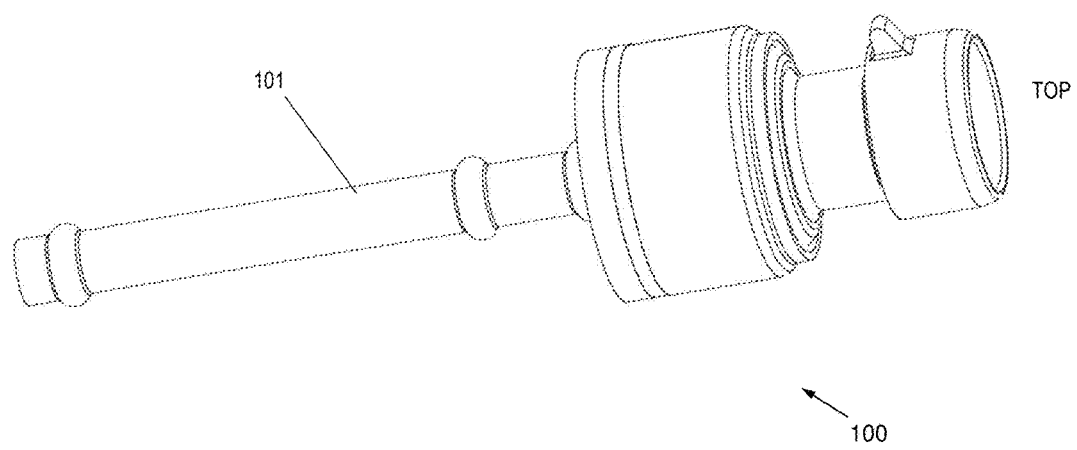
FIG. 2 is an isometric diagram depicting aspects of another exemplary pressure sensor according to the teachings herein.

Referring now to FIGS. 1 and 2, there are shown exemplary embodiments of a pressure sensor 100. Generally, the pressure sensor 100 is a case isolated, oil filled MEMS pressure sensor 100. Advantageously, the pressure sensor 100 is inexpensive to manufacture, simple in design, and electrically robust. Each embodiment of the pressure sensor 100 includes a pressure port 101. The pressure sensor 100 is exposed to a pressure environment through the pressure port 101 to sense pressure. In the embodiment shown in FIG. 1, the pressure sensor 100 includes a screw-on type of pressure port 101. In the embodiment shown in FIG. 2, the pressure sensor 100 includes a braze-on type of pressure port 101. Note that the illustrations in FIGS. 1 and 2 include an arbitrary designation of "top." The designation of "top" and other similar terms are merely for purposes of orientation of the reader and to aid in explanation of embodiments of the pressure sensor 100, and is not to be considered limiting of operation or installation of the pressure sensor 100 or elements thereof.

Figure 3:
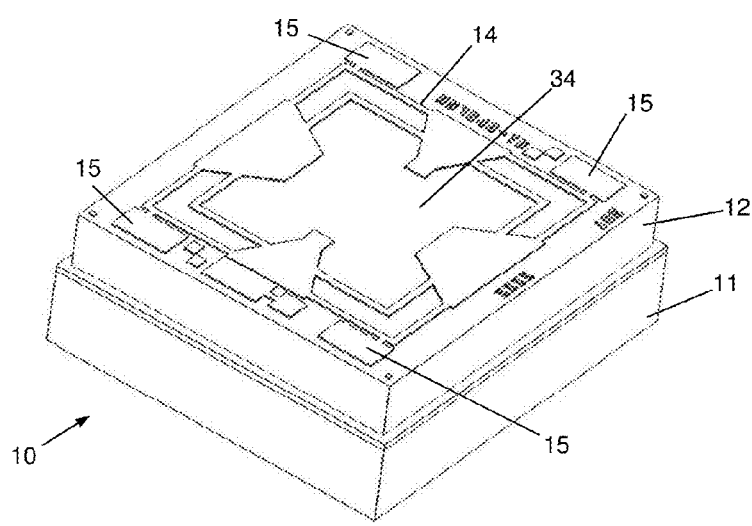
FIG. 3 is an isometric diagram of aspects of a pressure sensing element for use in the pressure sensor of FIGS. 1 and 2.

Referring now to FIG. 3, there is shown an exemplary embodiment of pressure sensing unit 10. In this embodiment, the pressure sensing unit 10 includes a pedestal 11 as a base to the pressure sensing unit 10. The pedestal 11 may be formed of a suitable material such as glass. Disposed on top of the pedestal 11 is a silicon die 12. The silicon die 12 may be bonded to the pedestal 11 using techniques as are known in the art. Disposed on top of the pedestal 11 is silicon die 12. In an upper most portion of the silicon die 12 is a diaphragm 34. The diaphragm 34 is host to a circuit 14. Included in the circuit 14 are a plurality of bond pads 15. The bond pads 15 provide for electrical connection of the circuit 14 for the pressure sensing unit 10 with external components. Generally, the external components provide for powering the circuit 14 and receiving data from the pressure sensing unit 10 and processing the data.

Figure 4:
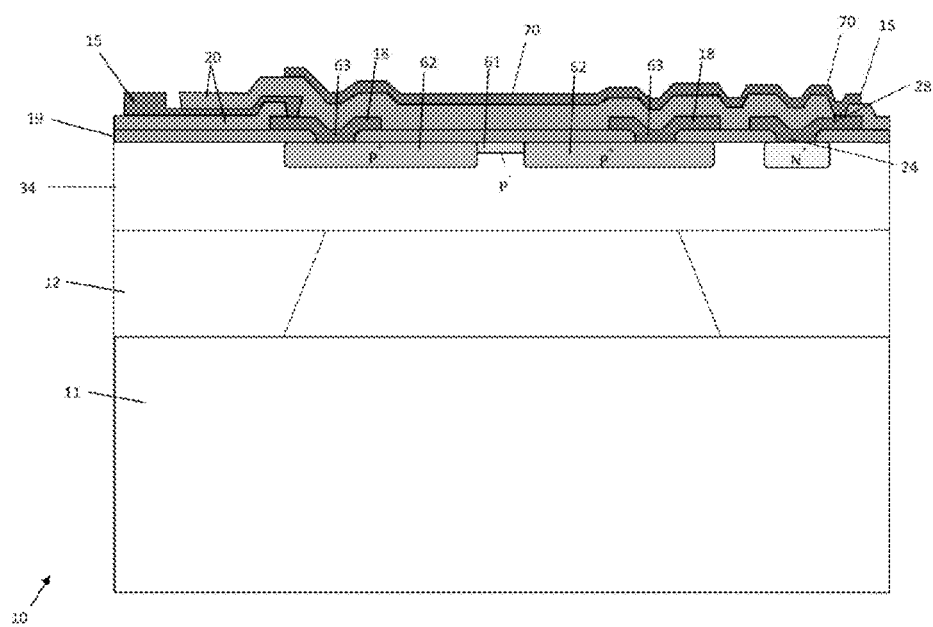
FIG. 4 is a composite cut-away view of the pressure sensing element of FIG. 3.
Figure 5:
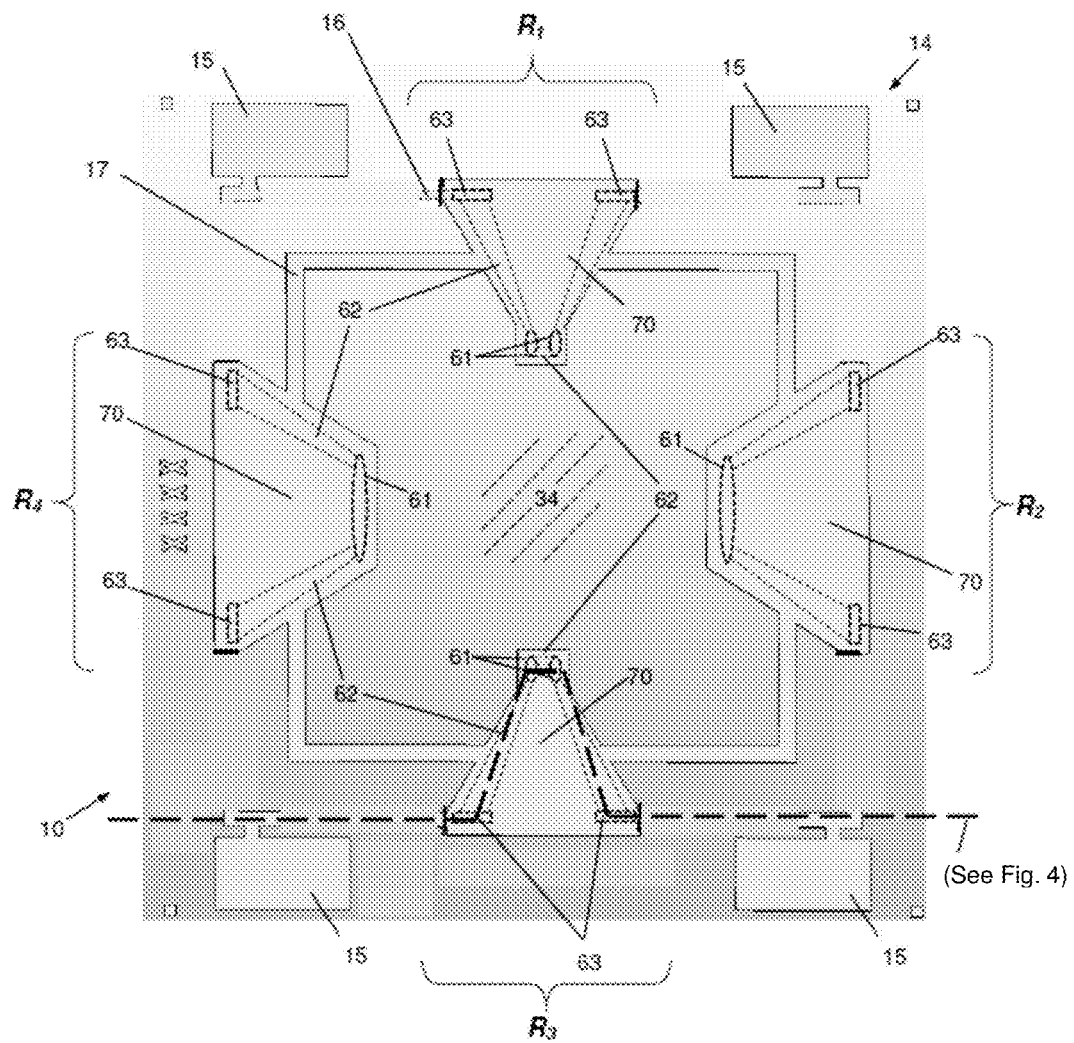
FIG. 5 is a top down view of the pressure sensing element of FIGS. 4 and 5.

In FIG. 4, a composite cross-section of the pressure sensing unit 10 is shown. Refer also to FIG. 5, where a dashed line towards the bottom of the diagram indicates the portions of the cross section of the pressure sensing unit 10 that are depicted in FIG. 4. Note that in FIG. 5, four sensing elements are shown. Each sensing element is denoted one of $R_1$, $R_2$, $R_3$, and $R_4$. Collectively, the four (4) sensing elements, $R_1$, $R_2$, $R_3$, and $R_4$, provide for the pressure sensing unit 10. It should be understood that the pressure sensing unit 10 may include additional or fewer sensing elements, and that grouping selected may be arranged in any manner determined appropriate to provide a desired function. Further, it should be understood that circuit devices may be of any geometry (for example, shape, profile, width, thickness and the like) deemed appropriate. FIG. 4 provides a composite cross-section or cut-away view of one sensing element, $R_3$.

In the exemplary embodiment of the pressure sensing unit 10, a lower portion of the silicon die 12 is fabricated of P type semiconductor material, while the diaphragm 34 is fabricated from N type semiconductor material. In some other embodiments, the lower portion of the silicon die 12 is fabricated of N type semiconductor material and the diaphragm 34 is fabricated from the same N type material. Implanted within the diaphragm 34 are interconnects 62. The interconnects 62 are fabricated of a P+ type of semiconductor material. The interconnects 62 provide for connection to a sensing sub-element 61. In this example, the sensing sub-element 61 is of a P− type of semiconductor material. A sensor contact via 63 provides electrical contact to each of the respective interconnects 62. The electrical contact to each interconnect 62 is accomplished with a respective sensor contact 18.

The sensing sub-elements 61 may include any type of component that provides for measuring a deflection or distortion of the diaphragm 34. For example, the sensing sub-elements 61 may include piezoresistive elements formed by light, positively doped (P−) silicon. The sensing sub-elements 61 are electrically coupled to respective electrical contact vias 63 by respective highly positively doped (P+) solid-state interconnects 62. The electrical contact vias 63 and interconnects 62 may be fabricated from semiconductor materials such as positively doped semiconductor materials. At least a portion of the circuit 14 may be disposed onto the top of the silicon die 12 through techniques such as photolithography, by deposition, or by other techniques deemed appropriate. The electrical contact vias 63 and interconnects may be implanted in the material of the silicon die 12, with at least a portion of the circuit 14 disposed there over. A respective field shield 70 is disposed over the sensing sub-elements 61, the electrical contact vias 63, and the interconnects 62. The respective field shield 70 is disposed over and electrically insulated from sub-elements 61, the electrical contact vias 63, and the interconnects 62, by a thin passivation film of suitable material, typically vapor deposited $Si_3N_4$ and/or thermally grown $SiO_2$.

A first passivation layer 19 provides for electrical separation of each of the sensor contact 18 from other components. Each sensor contact via 63 is in electrical communication with the trace of a bridge circuit 16. In turn, the bridge circuit 16 is connected to at least one bond pad 15. The at least one bond pad 15 provides for external electrical connections. A bias via 24 provides for electrical contact with the diaphragm 34. The bias via 24 is electrically connected to a bias contact 28. A top passivation layer 20 may be disposed over the first passivation layer 19, the sensor contacts 18, the bridge circuit 16, and at least a portion of the bias contact 28.

Disposed over the electrical components within the pressure sensing unit 10, is the field shield 70. Generally, the field shield 70 provides for shielding of the entire resistive bridge from the effects of negative surface charge that has accrued external to the pressure sensing unit 10. Among other things, the field shield 70 provides for application of an electric potential that limits susceptibility to surface charge accumulation in particular environments. Exemplary environments include oil filled environments.

When the pressure sensing unit 10 is energized, a voltage, V, is applied to the bond pad 15. Current, I, flows to a first sensor contact 18 and into a first interconnect 62 in a pair of the interconnects 62. The current passes through the sensing sub-element 61, onto a second interconnect 62 and out through a second sensor contact 18. (As a matter of convenience, an assembly of the first interconnect 62, the sensing sub-element 61, and the second interconnect 62 is referred to as a "resistive bridge" and by other similar terms). Flexing of the diaphragm 34 causes a change in the resistance of the sensing sub-element 61, and therefore a change in the signal at the second sensor contact 18.

Generally, each interconnect 62 includes highly doped P type material, while the sensing sub-element 61 may include a lower level of P type material. During operation, a P/N junction forms. Advantageously, the P/N junction provides electrical isolation of the resistive bridge from the N type of material. Thus, leakage of current, I, and therefore signal leakage is avoided.

Figure 6:
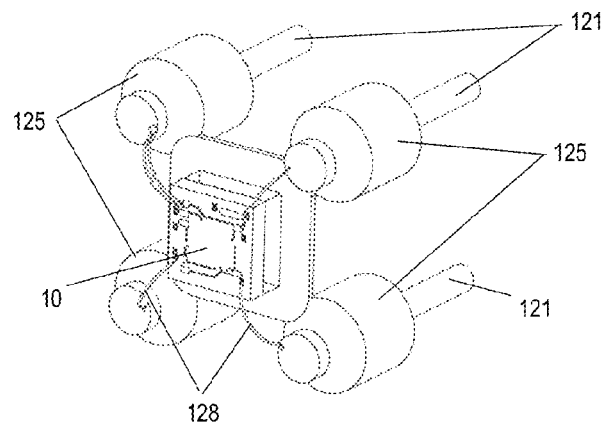
FIG. 6 is an isometric diagram depicting the pressure sensing element in conjunction with electrical contact pins.

Turning now to FIG. 6, the pressure sensing unit 10 is shown in conjunction with a plurality of electrical contact pins 121 (an accompanying header body is not shown in this illustration, such that the pressure sensing unit 10 and electrical contact pins 121 may be better illustrated). Each of the electrical contact pins 121 are outfitted with an insulator in the form of a glass-to-metal seal 125. Each glass-to-metal seal 125 provides for electrical isolation of the respective electrical contact pin 121 while ensuring a substantially hermetic seal (i.e., substantially leak-proof). The pressure sensing unit 10 is electrically coupled by wires 128 bonded to the pads 15 and electrical contact pins 121.

As used herein, the term "hermetic seal" refers to a seal that exhibits a leak rate no greater than 5E-6 std cc He/sec. However, it is considered that the actual seal efficacy may perform above (or below) this standard. It is also considered that performance of a successful seal is to be judged by the designer, manufacturer or user as appropriate.

Figure 7:
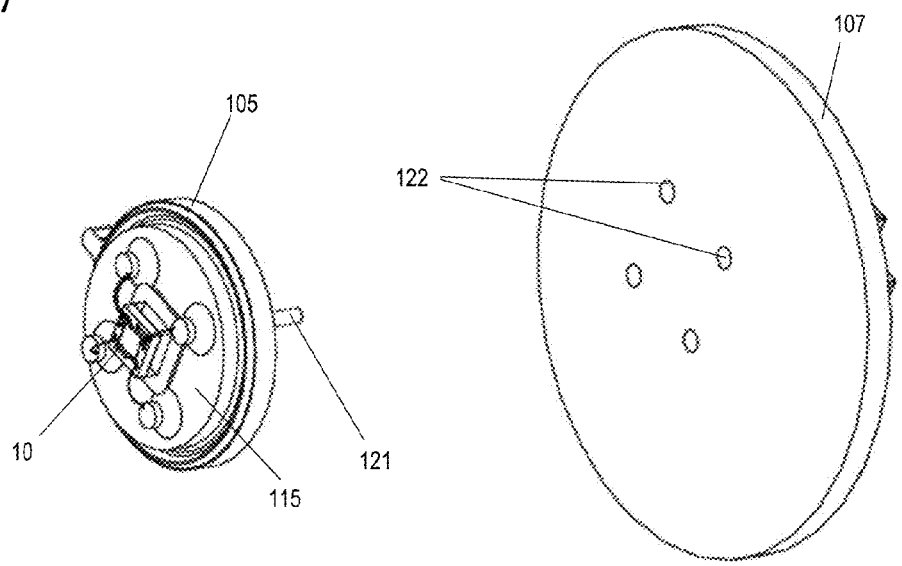
FIGS. 7 and 8 depict the pressure sensing element deployed in a MEMS assembly, and in relation to an electronics module assembly (EMA)

Referring now to FIG. 7, aspects of a MEMS assembly 105 are shown. Generally, the MEMS assembly 105 includes the pressure sensing unit 10 and the electrical contact pins 121 disposed in a header body 115. Generally, the header body 115 may be fabricated from any material suited for supporting the pressure sensing unit 10 within the pressure sensor 100. Thus, the header body 115 may be assembled using techniques such as welding, sintering, gluing, bonding, or other techniques. In some embodiments, the header body 115 may be stamped from sheet material. The electrical contact pins 121 align and ultimately mate with electrical feed-throughs 122 that are disposed in an electronics module assembly (EMA) 107. Aspects of the header body 115 and the electronics module assembly (EMA) 107 are shown in the opposing view provided in FIG. 8.

In general, the glass-to-metal seals 125 are set into the header body 115 using conventional techniques. Design and construction generally follows the principles that the molten glass is capable of wetting the metal (of the header body 115 and/or the electrical contact pins 121), in order to form a tight bond and the thermal expansion of the glass and metal is chosen to be relatively matched so that the seal remains solid as the assembly cools and during operation.

Figure 8:
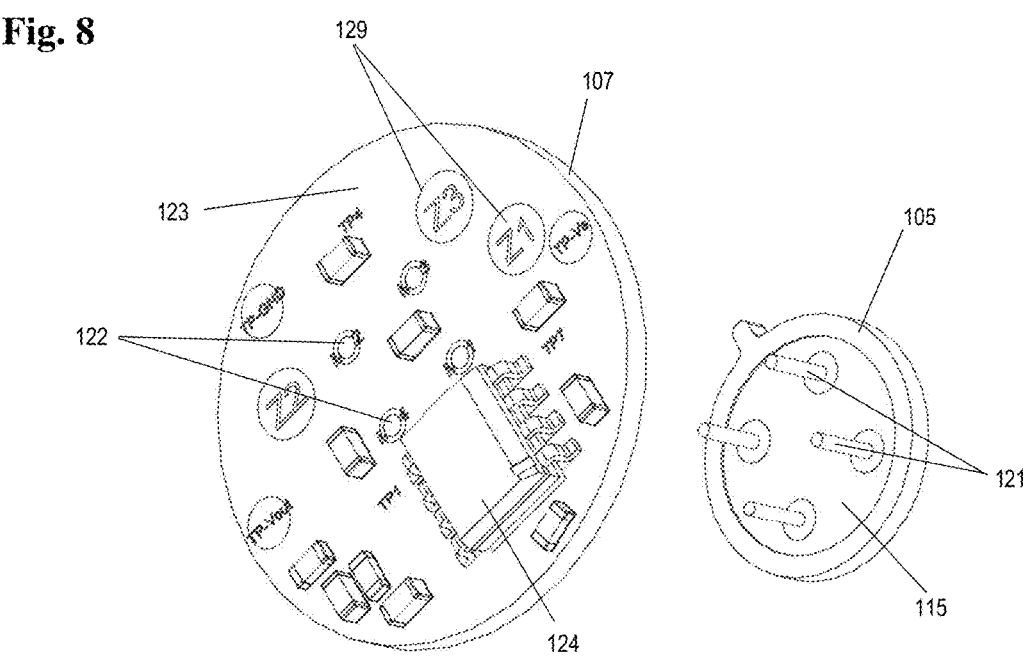

FIG. 8 illustrates electronics disposed on the electronics module assembly (EMA) 107. In this example, the electronics module assembly (EMA) 107 includes a printed circuit board (PCB) 123. The PCB 123 may include a processing circuit 124. In this example, the circuit 124 includes an application specific integrated circuit (ASIC), as well as other surface mounted components. Contact landings 129 for providing electrical contact with contact springs (introduced below) may be included. Disposed through the electronics module assembly (EMA) 107 are a plurality of electrical feed-throughs 122. In this example, the electronics module assembly (EMA) 107 includes four electrical feed-throughs 122. When assembled, the plurality of electrical contact pins 121 that are disposed through the baseplate 115 will fit within respective ones of the electrical feed-throughs 122. Once the electrical contact pins 121 are disposed within the respective ones of the electrical feed-throughs 122, the electrical contact pins 121 and the respective electrical feed-throughs 122 are electrically coupled. Techniques for coupling may include soldering, welding, force-fitting, and other techniques as deemed appropriate. The electrical contact pins 121 provide for electrical contact between pressure sensing unit 10 and the PCB 123.

Figure 9:
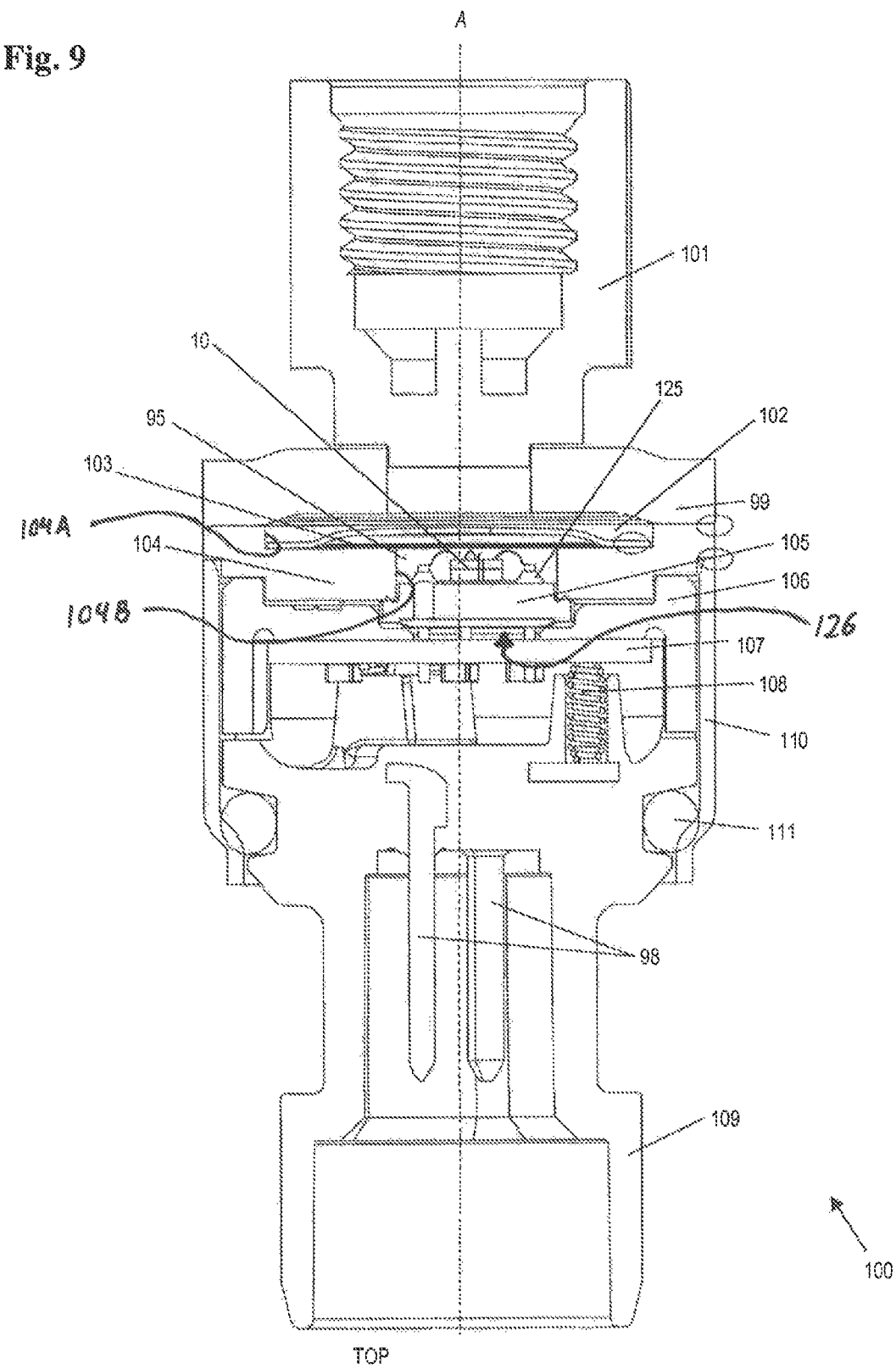
FIG. 9 is a cutaway side view of the pressure sensor of FIG. 1.

Referring now to FIG. 9, there is shown a cutaway illustration of the embodiment of the pressure sensor 100 depicted in FIG. 1. In this example, the pressure sensor 100 is a generally cylindrical component that extends along a central axis, A. Aspects of the geometry presented in the exemplary embodiments are merely for purposes of illustration and are not to be considered limiting of the pressure sensor 100.

In this example, the pressure sensor 100 includes a connector base 109. Disposed within the connector base 109 are external contacts 98. External contacts 98 may include, for example, connections for transmitting ground, power and data signals. In some embodiments, fewer or additional external contacts 98 are included (for example, a single contact may be used for transmitting power and data where the data signal is provided on top of or combined with the power signal).

In the exemplary embodiment, the connector base 109 is a substantially nonconductive material such as a high temperature and/or rigid polymer. In some other embodiments, the connector base 109 is a metallic material that is weldable. A variety of materials may be used. A housing 110 generally surrounds the connector base 109 and may be sealed by at least one O-ring 111. In the exemplary embodiment, the housing 110 is a metallic material that is welded to a baseplate 104. The housing 110 may be further sealed using traditional techniques such as gluing, heat sealing, by use of mechanical seals such as an interlock and by other similar techniques.

A plurality of contact springs 108 are disposed within the connector base 109 and make electrical contact with respective ones of the external contacts 98. In some embodiments, the contact springs 108 are coil springs. In some other embodiments, at least some of the contact springs 108 are leaf springs or other types of electrical contacts altogether. In the embodiment shown, the connector base 109 includes a receptacle for a respective contact spring 108. By incorporating receptacles for each one of the contact springs 108, retention of the contact springs 108 in an appropriate position is assured. Generally, each one of the contact springs 108 provides for electrical contact with a respective one of the electrical connectors 98 and respective contact landings 129 on the electronics module assembly (EMA) 107.

Generally, the electronics module assembly (EMA) 107 includes electronics necessary for operation of the pressure sensor 100. For example, the electronics module assembly (EMA) 107 may include at least one integrated circuit, such as an application specific integrated circuit (ASIC). The electronics module assembly (EMA) 107 may be provided as a printed circuit board (PCB). The electronics module assembly (EMA) 107 may be provided as another type of structure onto which circuit components are disposed and subsequently interconnected. In the example shown, the electronics module assembly (EMA) 107 is a generally planar structure, however, the electronics module assembly (EMA) 107 may be multi-tiered, include at least one orthogonally disposed component, and otherwise be oriented in any manner deemed appropriate. The electronics module assembly (EMA) 107 is electrically connected to MEMS assembly 105 (discussed further below). In the embodiment shown, the electronics module assembly (EMA) 107 is generally protected by an insulator 106. Additionally, the electronics module assembly (EMA) 107 may be electrically isolated from the pressure sensor 100 by the insulator 106.

As shown in FIG. 9, the MEMS assembly 105 may be offset from the electronics module assembly (EMA) 107 and maintain electrical separation therefrom. In the embodiment shown, the MEMS assembly 105 is nested onto the insulator 106 and retained in place by virtue of the electrical connections between the MEMS assembly 105 and the electronics module assembly (EMA) 107. The MEMS assembly 105 may be firmly retained within or adjacent to the insulator 106 by baseplate 104. The coupling of the MEMS assembly 105, insulator 106, and electronics module assembly (EMA) 107 defines an inner chamber 126. In particular, the insulator 106 includes an inner borehole 106A (shown in FIG. 10) which partially defines a space between the MEMS assembly 105, insulator 106, and electronics module assembly (EMA) 107 for the inner chamber 126. A separate sensor diaphragm 103 is disposed adjacent to the baseplate 104. The cavity 95 is created along the central axis, A, of the pressure sensor 100 and defined by the MEMS assembly 105, the baseplate 104 and the sensor diaphragm 103. Generally, the cavity 95 is filled with an appropriate type of fill oil for communicating pressure from the sensor diaphragm 103 to the MEMS assembly 105. An exemplary type of fill oil is silicone. Filling may be provided through fill port 94 (shown in FIG. 10).

The baseplate 104 has inner walls 104A, 104B which form two separate inner diameters. The first diameter of the first inner wall 104A is wider than the second diameter of the second inner wall 104B, and therefore forms a larger cross-sectional area. The diameter of the first inner wall 104A provides space for the diaphragm 103 to be seated within the baseplate 104 adjacent to the first inner wall 104A, the diaphragm 103 itself having a diameter that is relatively large compared to inner diameter of the second inner wall 104B. This allows for a large cross-sectional area of the diaphragm 103 to be exposed to pressure from fluid entering the pressure port 101. Meanwhile the narrower second inner wall 104B of the baseplate 104 significantly reduces the cross-sectional area the oil filled cavity 95 as compared to the cross-sectional area of the diaphragm 103. This reduced cross-sectional area allows for a relatively low oil volume within the oil filled cavity 95. The large diaphragm 103 area and low oil volume within the oil filled cavity 95 help temperature stabilize the pressure sensor 100 by reducing the effect of thermal expansion of the oil, as discussed herein.

The sensor diaphragm 103 is retained within the pressure sensor 100 by a flange 99. Coupled to the flange 99 is pressure port 101. Pressure port 101 generally includes a mount for mounting the pressure sensor 100 to a sense environment. In this example, the mounting includes threads for threading the pressure port 101 onto an external apparatus, such as a nipple (not shown).

Figure 10:
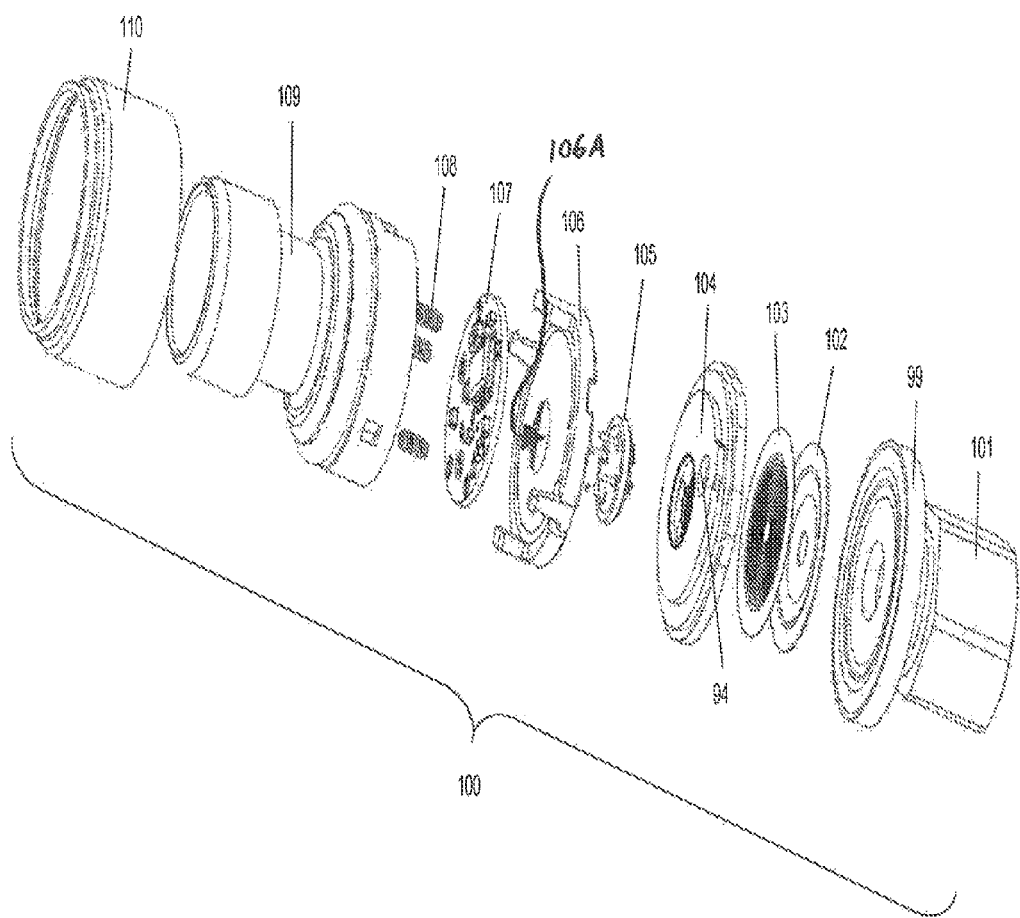
FIGS. 10 and 11 are exploded view isometric diagrams depicting aspects the pressure sensing element of FIG. 1.
Figure 11:
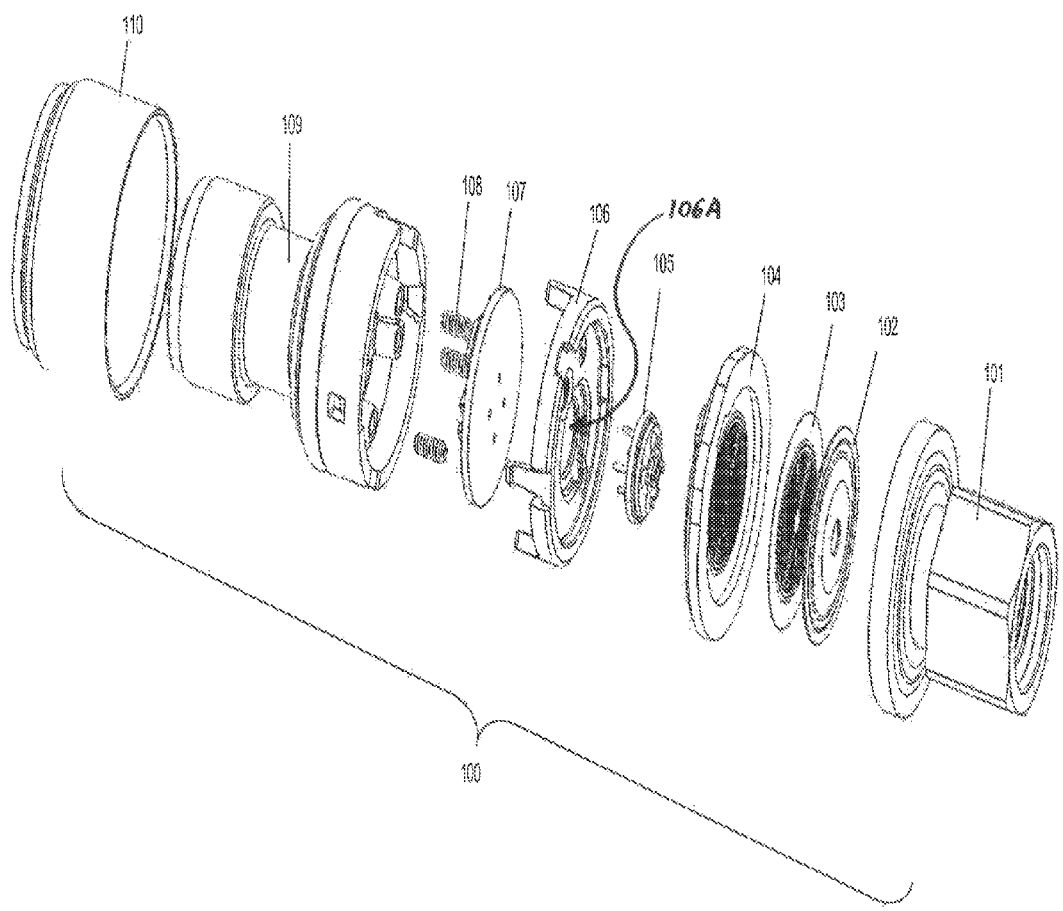

Referring now also to FIGS. 10 and 11, exploded isometric views of the pressure sensor 100 depicted in FIGS. 1 and 9 are shown. Assembly of the pressure sensor 100 may be performed in steps where some of the components shown are first joined together, and then joined to each other to provide the final product.

In one embodiment, an unfinished MEMS assembly 105 is first welded to the baseplate 104 about a periphery thereof. Subsequently, the pressure sensing unit 10 is set on the header body 115 and the wires 128 are bonded to the electrical contact pins 121. Subsequently, the combination of the MEMS assembly 105 and the header assembly are joined with the sensor diaphragm 103 and the weld ring 102. Laser welding of the weld ring 102 then seals the diaphragm into place on a side of the baseplate 104 that is opposite to the MEMS assembly 105. Once the cavity 95 is thus created, the cavity 95 may then be evacuated of moisture, after which the cavity 95 is filled with oil through the fill port 94. Once filled, the fill port 94 is sealed. Sealing of the fill port 94 may be accomplished, for example, with a ball weld. Subsequently, the insulator 106 is placed over the MEMS assembly 105 and the electronics module assembly (EMA) 107 is soldered to the electrical contact pins 121 protruding therethrough. The assembly is then inserted into the connector base 109 along with the contact springs 108, and the housing 110 is then placed over the connector base 109 and the assembled components. The flange 99 is then mated with the housing 110 and welded thereto to provide for an assembled embodiment of the pressure sensor 100.

In some embodiments, the volume of the fill oil is in a range of between about 80 mm$^3$ to about 120 mm$^3$. In some embodiments, the diameter of the sensor diaphragm 103 is in the range of about 10 mm to about 18 mm, with a thickness that is less than about 0.05 mm. By using small sized glass-to-metal sealed header assemblies and larger area stamped parts, cost for the pressure sensor 100 is kept low.

A variety of techniques may be used for assembling and joining components of the pressure sensor 100. Techniques include various forms of welding, including those making use of a gas flame, an electric arc, a laser, an electron beam, friction, and/or ultrasound. Additional materials and/or components may be supplied.

Figure 12:
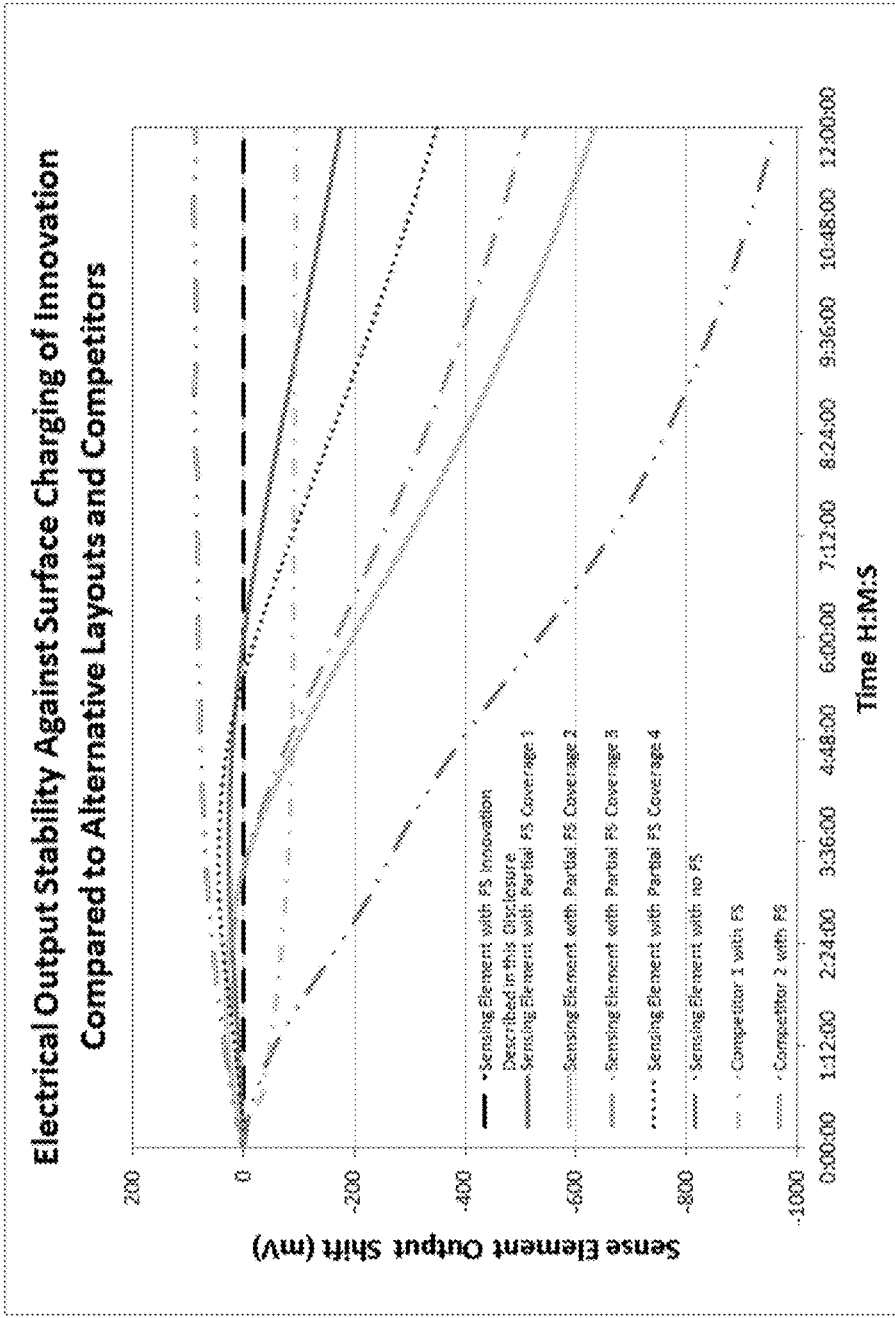
FIG. 12 is a graph depicting comparative performance of sensing elements.
Figure 13:
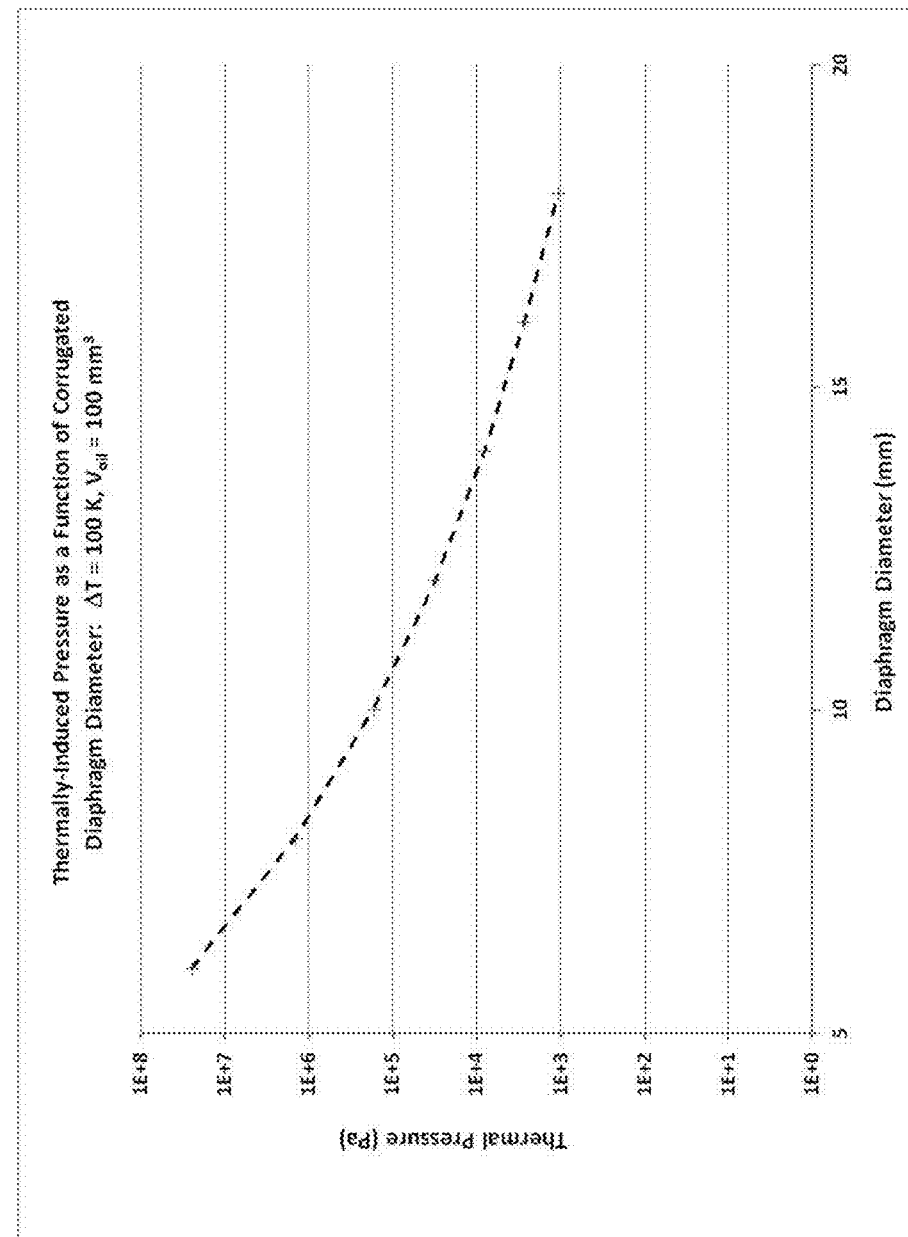
FIGS. 13-16 are graphs depicting aspects of performance of the pressure sensor as a function of design variables.
Figure 14:
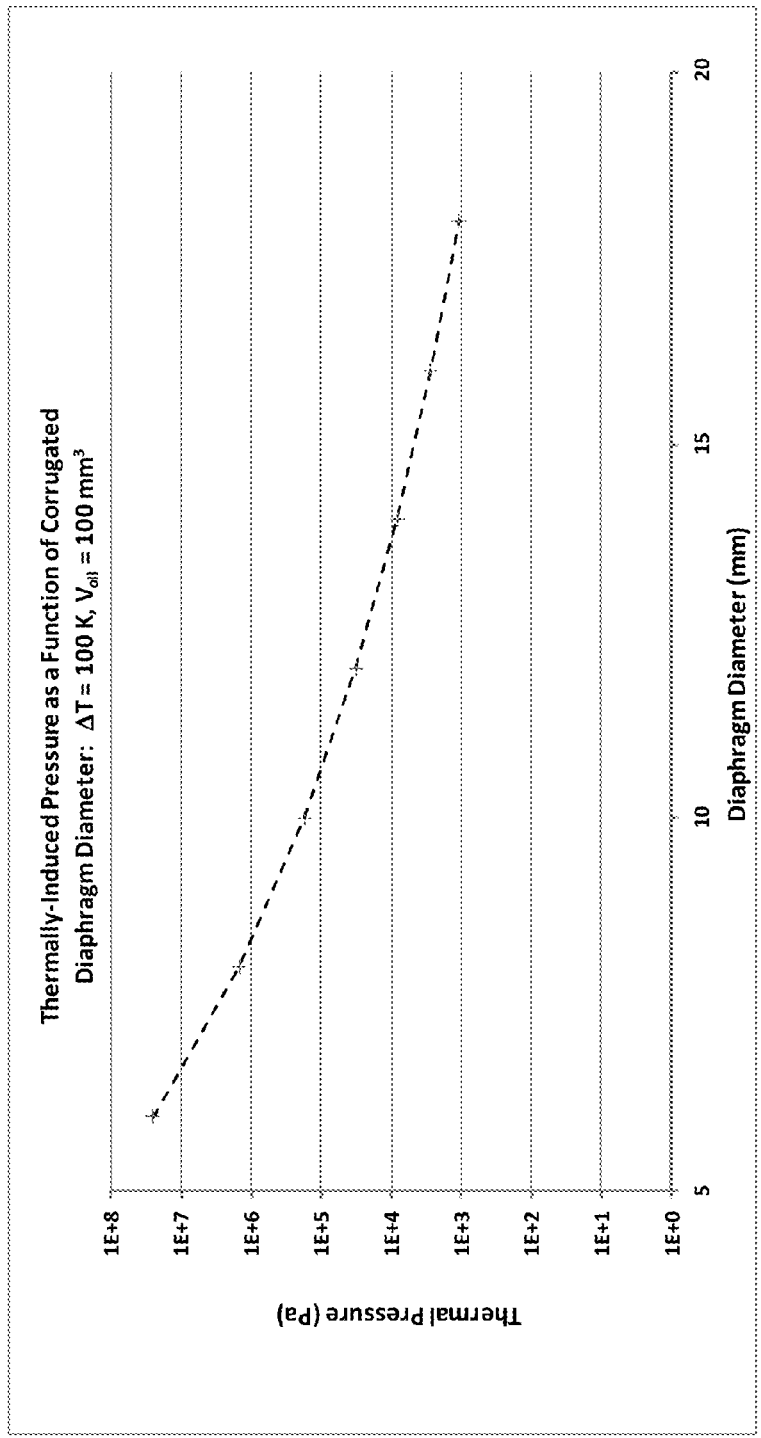
Figure 15:
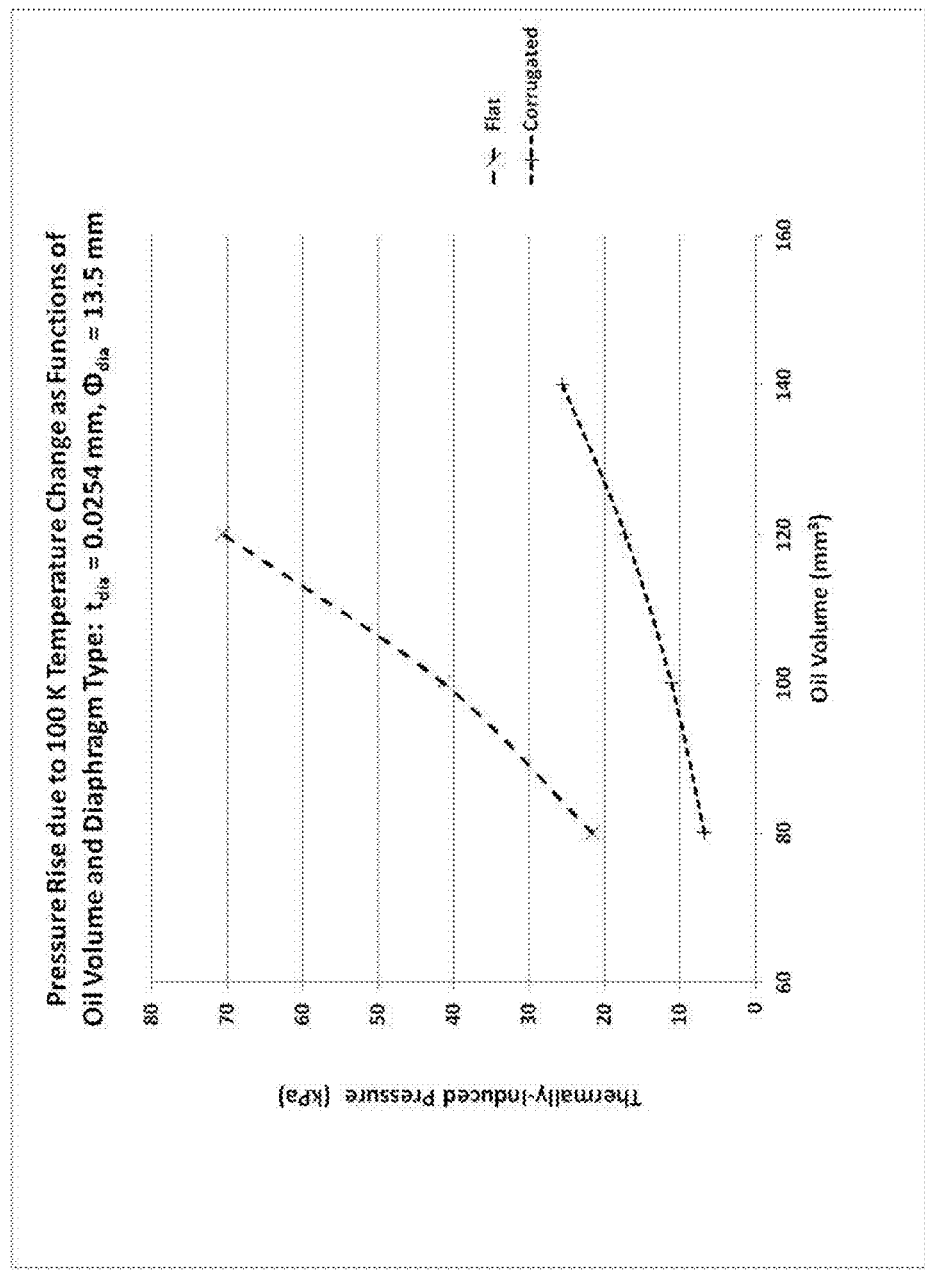
Figure 16:
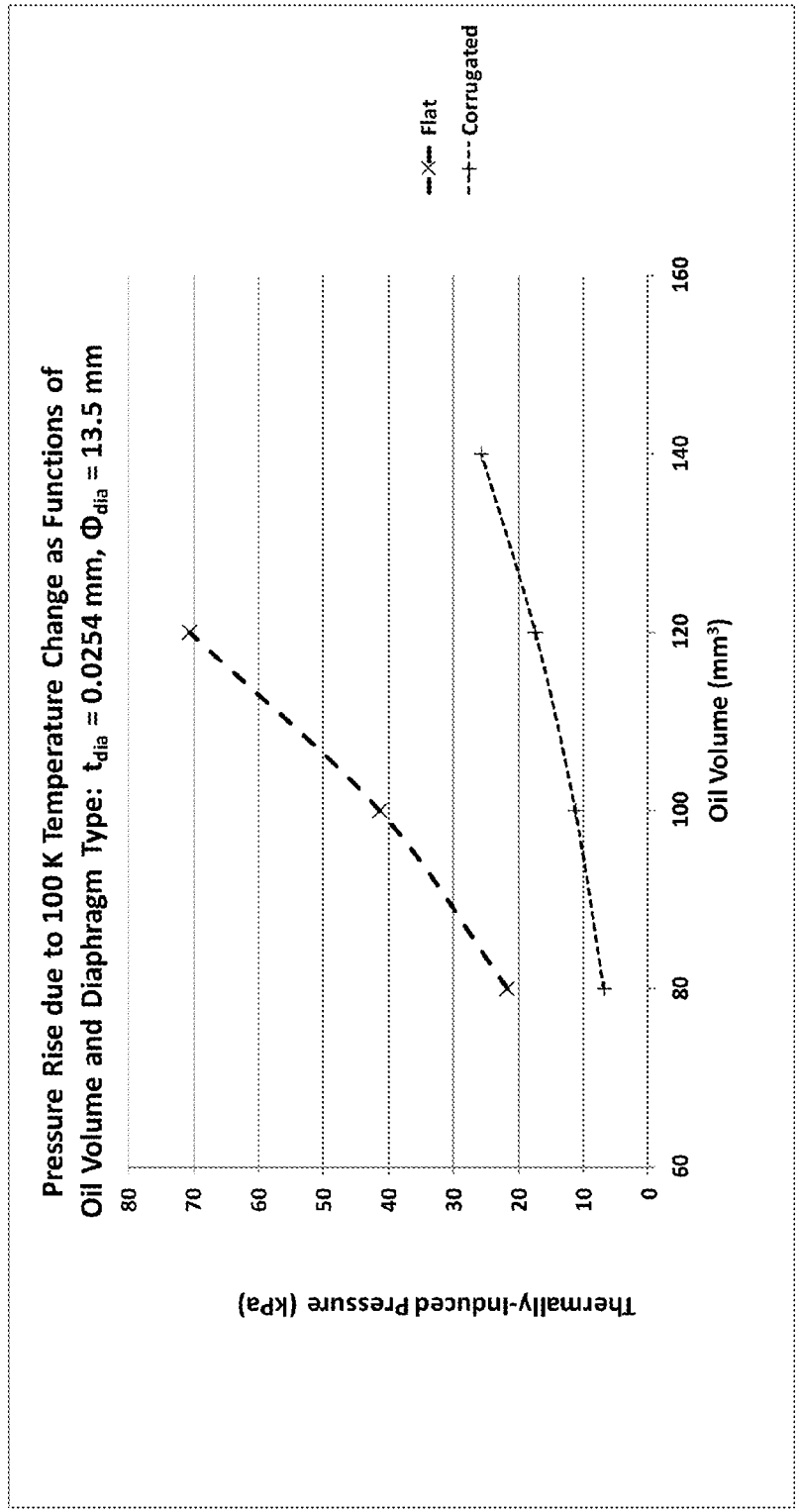

FIG. 12 depicts comparative performance of pressure sensors 100. As may be seen in the graph, a pressure sensor making use of the pressure sensing unit 10 and other aspects discussed herein exhibits performance that is substantially free of shift in an electrical output signal.

FIGS. 13-16 are graphs that illustrate relationships of sensor design with performance of the pressure sensor 100. By controlling the design variables, such as diameter of the sensor diaphragm 103, form of the sensor diaphragm 103 (e.g., flat or corrugated), and volume of the fill-oil, performance of the pressure sensor may be controlled.

Accordingly, by using a "drift-stabilized" sensing element, such as the pressure sensing unit 10, with electrical isolation of the sensing element, such as may be provided with the glass-to-metal seals 125, designers are provided with greater latitude in customizing the physical aspects of the sensor diaphragm and fill-oil used in an oil-filled pressure sensor.

Having introduced embodiments of the pressure sensor 100, some additional aspects are now presented.

Whether supplied as an integrated sensing unit or as a discrete sensing unit, the pressure sensing unit 10 may be used in a cavity that is filled with fill oil as a pressure transfer media, and be configured with a thin flexible diaphragm between the fill oil and the pressure media to be sensed. Metal portions of the oil filled cavity may be connected to earth ground, while electronic portions may be isolated from ground to at least 1.8 kV AC for at least one second, and have insulation resistance of at least 50 MOhms at 500 V.

In some embodiments, the pressure sensor is configured to provide for calibration through terminal connections of power, ground and output. With such capabilities, the number of electrical contact pins may be limited over those required in competing devices, thus saving cost.

Embodiments of the pressure sensor disclosed herein are useful for sensing pressure in a variety of settings. For example, the pressure sensor may be used in chillers such as those found in industrial applications such as hospitals, production facilities, institutions and the like. The pressure sensor may be used in HVAC applications such as commercial, residential and industrial applications. The pressure sensor may be used in intake or exhaust associated with production streams involved in environmental controls, energy production, coolants transfer, effluent generation and the like. The pressure sensor may be configured for sensing pressure in gaseous or liquid environments.

In some embodiments, the pressure sensor includes at least another pressure sensing unit. Accordingly, the pressure sensor may be configured to provide differential pressure in a sensing environment.

As discussed herein, terminology relating to "electrical separation" generally refers to conditions adequate for maintaining a neutral field between electrical components. In some embodiments, electrical separation may also be referred to as electrical isolation. Electrical separation may be realized by application of intervening layers such as a passivation layer. In some embodiments, electrical separation may rely upon (or additionally make use of) biasing of a circuit element.

As discussed herein, "substantially eliminating influence of external charge on the sensing element" generally refers to reducing influence of charge accumulation on output of the sensing element. For example, substantially eliminating influence of external charge results in reductions of output drift to levels that are within acceptability for a particular design, or from the perspective of a designer, manufacturer, user, or other similarly interested person. Alternatively, substantially eliminating influence of external charge results in reductions of output drift to levels that exceed the performance of competitive designs.

As discussed herein, the term "signal drift" generally refers to changes in a data signal that deviate from a true value and result from an external influence. Exemplary external factors that may cause signal drift include buildup of charge carriers as well as substantial deviation from a design temperature.

As discussed herein, "thermally induced pressure" generally refers to changes in the pressure within the oil filled cavity of the pressure sensor as a result of temperature changes. Generally, the pressure sensor is designed with regard for limiting the effect of temperature changes on the pressure signal sensed. By designing the pressure sensor to limit the influence of temperature (i.e., providing a "temperature stabilized design"), output data is more closely indicative of ambient pressure conditions. Aspects that may be considered in the design include, without limitation and as discussed above, diaphragm geometry, diaphragm form and volume of the oil filled cavity in the oil filled pressure sensor. Other aspects may also be considered and/or adjusted. Exemplary other aspects include thermal coefficients of expansion (TCE) of materials used to construct the sensor, thickness of materials, width, diameter, geometry, flexibility and other such aspects. Other aspects include evaluating at least one of volume of the oil filled cavity and thermal coefficients of expansion (TCE) of the oil for the oil filled cavity.

Various other components may be included and called upon for providing for aspects of the teachings herein. For example, additional materials, combinations of materials and/or omission of materials may be used to provide for added embodiments that are within the scope of the teachings herein.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A pressure sensor comprising:
a first diaphragm having a first side and a second side, the first side exposed to an environment having a pressure and the second side exposed to an oil filled cavity;
a baseplate sealed to the first diaphragm and a MEMS assembly to hermetically seal the oil filled cavity, the baseplate having a first inner wall forming a first inner diameter on the first side of the first diaphragm and a second inner wall extending from the second side of the first diaphragm and having a second inner diameter;
at least one channel through a header body within the MEMS assembly, each channel being filled with a contact pin that is hermetically sealed to, and electrically isolated from, the header body, and
a second diaphragm included as part of the MEMS assembly, the second diaphragm having a first side and a second side, the first side of the second diaphragm exposed to the oil filled cavity and the second side of the second diaphragm exposed to an inner chamber within the pressure sensor, the second diaphragm including a plurality of piezoresistive elements on the first side, the piezoresistive elements electrically configured to sense the pressure in the environment, wherein:
the first inner diameter is greater than the second inner diameter; and
the second side of the first diaphragm, the second inner wall, and the MEMS assembly define a volume of oil within the oil stabilized cavity to temperature stabilize the pressure sensor.

2. The pressure sensor of claim 1, wherein the contact pins electrically couple the piezoresistive elements to an electronics module assembly.

3. The pressure sensor of claim 2, wherein the electronics module assembly is offset from the MEMS assembly and contained within the pressure sensor.

4. The pressure sensor of claim 3, wherein the electronics module assembly includes a printed circuit board containing processing circuitry for processing signals received from the piezoresistive elements.

5. The pressure sensor of claim 2, wherein the electronics module assembly includes an application specific integrated circuit for processing signals received from the piezoresistive elements.

6. The pressure sensor of claim 5, further comprising a connector base housing at least one contact spring within a receptacle, the at least one contact spring forming an electrical connection between the electronics module assembly and at least one external contact,
wherein the at least one external contact is housed within the connector base.

* * * * *